US009921657B2

(12) United States Patent
Sprenger et al.

(10) Patent No.: US 9,921,657 B2
(45) Date of Patent: Mar. 20, 2018

(54) RADAR-BASED GESTURE RECOGNITION

(71) Applicant: Intel Corporation, Santa Clara, CA (US)

(72) Inventors: Mark E. Sprenger, Folsom, CA (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 14/229,727

(22) Filed: Mar. 28, 2014

(65) Prior Publication Data
US 2015/0277569 A1   Oct. 1, 2015

(51) Int. Cl.
G06F 3/01      (2006.01)
G06F 3/046     (2006.01)

(52) U.S. Cl.
CPC .............. G06F 3/017 (2013.01); G06F 3/046 (2013.01)

(58) Field of Classification Search
CPC .......... G06F 3/017; G06F 3/042; G06F 3/044; G06F 2203/04106; G06F 2203/04101; G06F 1/1698; H04B 1/7163; H04W 4/023; H04W 52/0254; H04W 52/0251; H01Q 1/243
See application file for complete search history.

(56) References Cited

U.S. PATENT DOCUMENTS

| | | | |
|---|---|---|---|
| 5,543,799 A * | 8/1996 | Heger | G01S 7/03 342/137 |
| 6,239,736 B1 * | 5/2001 | McDonald | G01S 7/2922 340/554 |
| 6,250,601 B1 * | 6/2001 | Kolar | E03C 1/057 251/129.04 |
| 7,911,448 B2 * | 3/2011 | Uchiyama | G06F 3/03543 345/158 |
| 2002/0130807 A1 * | 9/2002 | Hall | G01S 7/282 342/28 |
| 2005/0091610 A1 | 4/2005 | Frei et al. | |
| 2005/0270221 A1 * | 12/2005 | Fedotov | G01S 13/0209 342/28 |
| 2006/0018369 A1 * | 1/2006 | Sanada | H04B 1/7183 375/149 |

(Continued)

FOREIGN PATENT DOCUMENTS

KR   1020080036090 A   4/2008
KR   10-2010-0045434 A   5/2010

(Continued)

OTHER PUBLICATIONS

Azevedo et al., "Micropower Impulse Radar," Science & Technology Review, Jan./Feb. 1996, 7 pages.

(Continued)

Primary Examiner — Darlene M Ritchie
(74) Attorney, Agent, or Firm — Jordan IP Law, LLC

(57) ABSTRACT

Systems and methods may provide for using one or more radar measurements to detect a gesture of a body part relative to a mobile device and comparing the gesture to one or more known gestures. Additionally, if the gesture corresponds to at least one of the one or more known gestures, an application running on the mobile device may be notified of the gesture. In one example, the one or more radar measurements are obtained from a plurality of ultra-wideband (UWB) radar modules.

16 Claims, 5 Drawing Sheets

(56) References Cited

U.S. PATENT DOCUMENTS

| | | | | |
|---|---|---|---|---|
| 2006/0170584 | A1* | 8/2006 | Romero | A61B 5/0507 342/22 |
| 2007/0041426 | A1* | 2/2007 | Hashimoto | H04B 1/7163 375/130 |
| 2007/0205937 | A1* | 9/2007 | Thompson | G01S 7/414 342/22 |
| 2008/0246650 | A1* | 10/2008 | Teshirogi | G01S 13/106 342/204 |
| 2009/0140887 | A1* | 6/2009 | Breed | G01C 21/165 340/990 |
| 2010/0111358 | A1 | 5/2010 | Chai et al. | |
| 2011/0083111 | A1 | 4/2011 | Forutanpour et al. | |
| 2011/0181509 | A1* | 7/2011 | Rautiainen | G06F 3/017 345/158 |
| 2011/0286676 | A1 | 11/2011 | El Dokor | |
| 2012/0050180 | A1* | 3/2012 | King | G06F 3/0416 345/173 |
| 2012/0060109 | A1 | 3/2012 | Han et al. | |
| 2012/0068876 | A1* | 3/2012 | Bangera | G01S 7/415 342/27 |
| 2012/0092284 | A1* | 4/2012 | Rofougaran | G06F 3/017 345/173 |
| 2012/0182175 | A1* | 7/2012 | Krapf | G01V 3/12 342/118 |
| 2012/0268308 | A1 | 10/2012 | Tuttle | |
| 2012/0280900 | A1* | 11/2012 | Wang | G06F 3/0488 345/156 |
| 2013/0245436 | A1* | 9/2013 | Tupin, Jr. | A61B 5/0444 600/430 |
| 2013/0314317 | A1 | 11/2013 | Wu et al. | |
| 2014/0063055 | A1* | 3/2014 | Osterhout | G06F 3/005 345/633 |
| 2014/0071069 | A1* | 3/2014 | Anderson | A63F 13/06 345/173 |
| 2014/0106684 | A1* | 4/2014 | Burns | H01Q 1/243 455/78 |
| 2014/0198058 | A1* | 7/2014 | Warden | G06F 3/0416 345/173 |
| 2014/0198073 | A1* | 7/2014 | Gu | G06F 3/0488 345/174 |
| 2014/0223374 | A1* | 8/2014 | Park | G06F 3/017 715/825 |
| 2014/0253287 | A1* | 9/2014 | Bauman | G07C 9/00309 340/5.61 |
| 2014/0282224 | A1* | 9/2014 | Pedley | G06F 3/017 715/784 |
| 2014/0282275 | A1* | 9/2014 | Everitt | G06F 3/017 715/863 |
| 2014/0324888 | A1* | 10/2014 | Xie | G06F 3/017 707/748 |
| 2015/0009062 | A1* | 1/2015 | Herthan | E05B 83/16 342/70 |
| 2015/0084884 | A1* | 3/2015 | Cherradi El Fadili | G06F 3/041 345/173 |
| 2015/0138144 | A1* | 5/2015 | Tanabe | G06F 3/045 345/174 |

FOREIGN PATENT DOCUMENTS

| | | |
|---|---|---|
| KR | 1020110090973 A | 8/2011 |
| KR | 1020120028757 A | 3/2012 |

OTHER PUBLICATIONS

Sprenger, Mark E., "Sharing Information Between Computing Devices", International Application No. PCT/US2013/030743, filed on Mar. 13, 2013, 45 Pages.

International Search Report and Written Opinion received for International Patent Application No. PCT/US2013/030743, dated Aug. 30, 2013, 11 Pages.

Curran et al., "RFID-Enabled Location Determination within Indoor Environments," 2009, available from <http://www.scis.ulster.ac.uk/~kevin/ijaciRfidRadar.pdf>, 21 pages.

International Search Report and Written Opinion for Patent Application PCT/US2015/023220, dated Jun. 26, 2015, 11 pages.

Office Action and Search Report for Taiwanese Patent Application No. 104105364, dated Jan. 21, 2016, 15 pages including 8 pages of English translation.

Office Action for Taiwanese Patent Application No. 104105364, dated Apr. 29, 2016, 7 pages with 3 pages of English translation.

International Preliminary Report on Patentability for International Patent Application No. PCT/US2015/023220, dated Oct. 13, 2016, 8 pages.

Office Action for Korean Patent Application No. 10-2016-7023536, dated Jul. 14, 2017, 9 pages including 4 pages of English translation.

\* cited by examiner

RADAR-BASED GESTURE RECOGNITION

TECHNICAL FIELD

Embodiments generally relate to gesture recognition. More particularly, embodiments relate to radar-based gesture recognition.

BACKGROUND

Hand gesture control of mobile devices may involve the analysis of images captured by a camera embedded in the mobile device. Cameras, however, have a number of line of sight related challenges that may prevent gesture recognition from being effective. For example, poorly lit environments may have a negative impact on the quality of the image and in turn degrade performance. Additionally, gloves and other obstructions may inhibit accurate recognition of the hand and/or fingers. Moreover, the mobile device being placed in a bag, pouch, pocket and/or purse may preclude any image from being captured by the camera.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
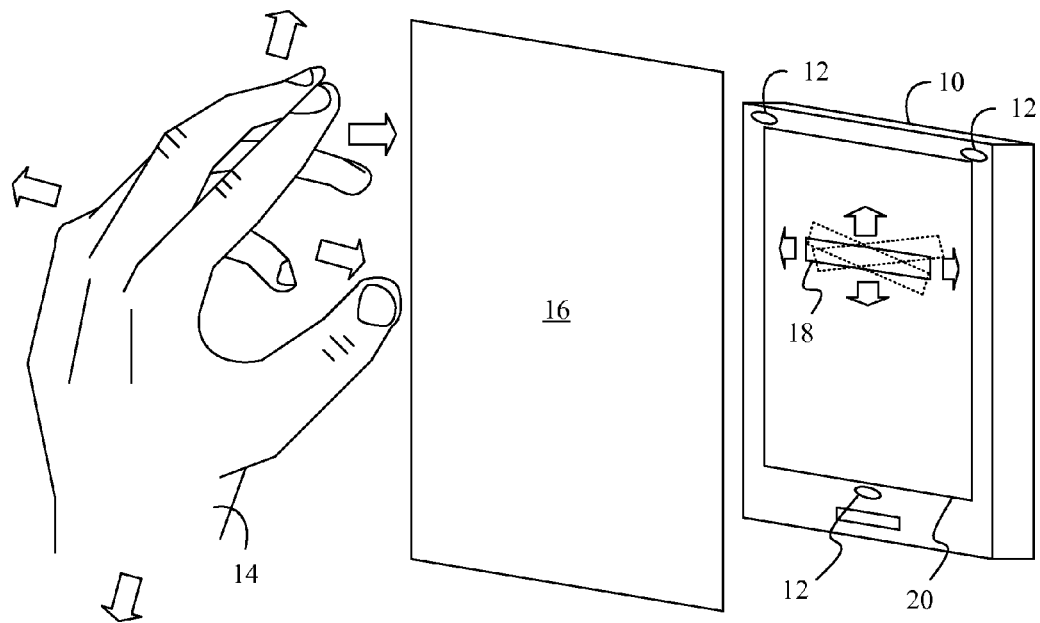
FIG. 1 is an illustration of an example of a gesture recognition scenario according to an embodiment.

Turning now to FIG. 1, a scenario is shown in which radar-based gesture recognition is conducted. In the illustrated example, a mobile device 10 (e.g., notebook computer, tablet computer, convertible tablet, smart phone, personal digital assistant/PDA, mobile Internet device/MID, wearable device, portable All-In-One (pAIO)) includes a plurality of ultra-wideband (UWB) radar modules 12 that detect the movement of a body part such as a hand 14, head, eyelid, and so forth. As will be discussed in greater detail, the UWB radar modules 12, which may be integrated into the mobile device 10 and/or attached to the mobile device 10 as peripheral components, may transmit a series of ultra-wideband (UWB) electromagnetic pulses (e.g., outbound pulses) and monitor the environment for reflected pulses (e.g., inbound pulses) from the hand 14.

In one example, the UWB radar modules 12 are micro-power ultra-wideband impulse radar (MUIR) devices having low power consumption. The monitoring may involve the use of triangulation techniques, which are facilitated by the deployment of multiple UWB radar modules 12. The outbound and inbound pulses may penetrate an obstruction 16 such as, for example, a glove worn by the hand 14 and/or the fabric of a bag, pouch, pocket or purse containing the mobile device 10. The outbound and inbound pulses may also be unaffected by the amount of light in the environment and may enable gesture recognition in the dark.

In the illustrated example, both lateral characteristics (e.g., up, down, left, right) and depth characteristics (e.g., inward, outward) of the movement of the hand 14 relative to the mobile device 10 may be identified and used to determine whether a known gesture is being made. Moreover, various aspects of the mobile device 10 such as, for example, the behavior of an object 18 (e.g., icon, image, window, text) presented on a display 20 of the mobile device 10 may be controlled based on the results of the gesture recognition. For example, an inward gesture of the hand 14 toward the mobile device 10 might cause the object 18 to be selected (e.g., as in a mouse click operation), wherein a gesture of the hand 14 to the left may cause the object 18 to correspondingly move to the left (e.g., as in a drag operation). Similar responses may be created for gestures in other directions. Moreover, other applications and/or controls such as, for example, media playback (e.g., play, pause, volume adjustment, track selection), game play, word processing, and so forth, may be linked to the gestures of the hand 14.

Figure 2:
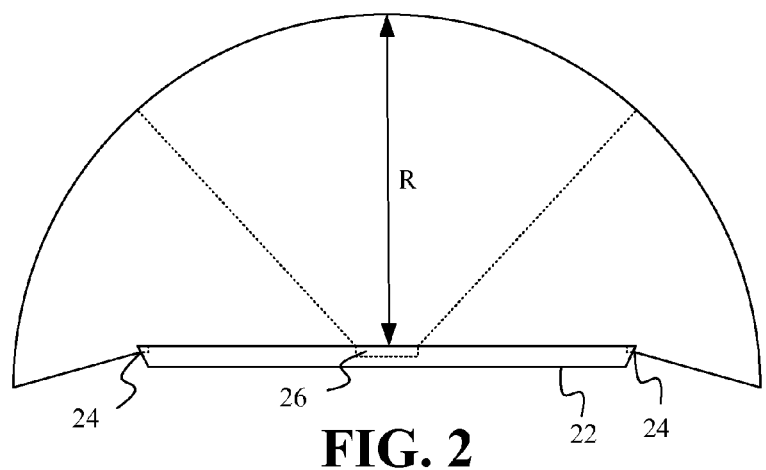
FIG. 2 is a side view of an example of a mobile device according to an embodiment.

FIG. 2 shows a side view of a mobile device 22 having a plurality of UWB radar modules that are configured to detect gestures at a relatively wide angle. In the illustrated example, antennas 24 of the UWB radar modules are positioned along the edges of the device 22 to enable more than 180° of detection. Thus, the placement of the antennas 24 may enable the recognition of gestures made beside and even behind the mobile device 22. By contrast, a camera 26 embedded in the mobile device 22 may have a much smaller field of view in front of the mobile device 22. Indeed, even the addition of a camera to the rear of the mobile device 22 may not achieve the broad detection range of the illustrated approach. The UWB radar modules may also provide the mobile device 22 with a configurable detection range "R" so that objects and motion beyond the range may be effectively filtered out of the gesture recognition process.

Figure 3:
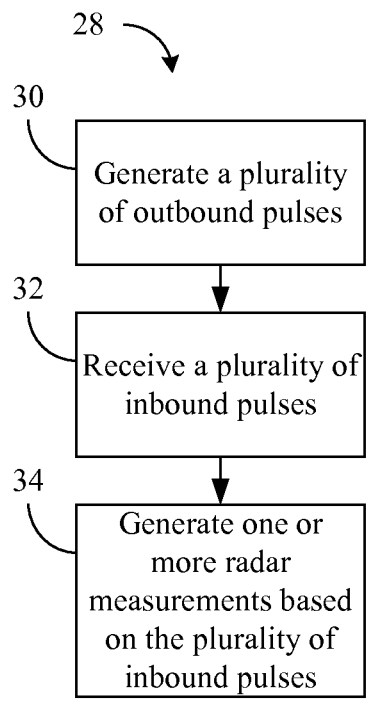
FIG. 3 is a flowchart of an example of a method of operating a ultra-wideband (UWB) radar module according to an embodiment.

Turning now to FIG. 3, a method 28 of operating a UWB radar module, is shown. The method 28 may be implemented as one or more modules in set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 28 may be written in any combination of one or more programming languages, including an object oriented programming language such as JAVA, Smalltalk, C++ or the like and conventional procedural programming languages, such as the "C" programming language or similar programming languages.

Illustrated processing block 30 provides for generating a plurality of outbound pulses, wherein the outbound pulses may be UWB wideband electromagnetic pulses capable of penetrating various obstructions and/or materials such as fabrics, plastics and other opaque objects. A plurality of inbound pulses may be received at block 32. The inbound pulses may reflect off of a moving body part such as a hand and may also penetrate certain materials and/or objects. The timing between the outbound pulses and the inbound pulses may be indicative of the presence of a gesture being made within the detection range of the UWB radar modules. Illustrated block 34 generates one or more radar measurements based on the plurality of inbound pulses. The radar measurements may be in digital or analog format, and may be incorporated into one or more messages, packets, commands, etc., or any combination thereof.

Figure 4:
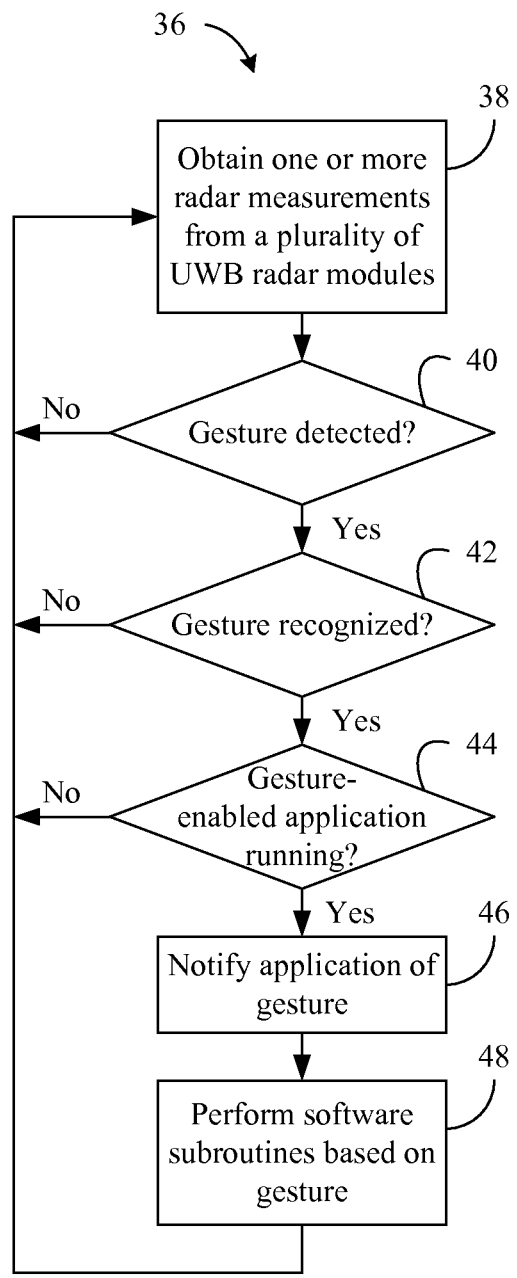
FIG. 4 is a flowchart of an example of a method of conducting radar-based gesture recognition according to an embodiment.

FIG. 4 shows a method 36 of conducting radar-based gesture recognition. The method 28 may be implemented as one or more modules in set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated processing block 38 provides for obtaining one or more radar measurements from a plurality of UWB radar modules, wherein a determination may be made at block 40 as to whether a gesture has been detected. The gesture may be detected while an obstruction is positioned between the body part in question and the mobile device, as well as while the body part is outside the line of sight of one or more cameras coupled to the mobile device. If a gesture is detected, block 42 may determine whether the detected gesture is recognized. Block 42 may involve comparing the gesture to one or more known gestures (e.g., a gesture library), wherein if the gesture corresponds to at least one of the one or more known gestures, the gesture may be considered as recognized. The comparison may take into consideration various lateral characteristics and/or depth characteristics identified with regard to the gesture.

In this regard, the method 36 may also include a calibration process (not shown) that may be conducted offline. The calibration process may involve the user performing known gestures at random locations around the device and using the gestures performed during calibration to define, update and/or adapt the gesture library. Such an approach may enable the device to more accurately understand gestures from a specific user and eliminate false positives, which may be advantageous given potential variability between hand shapes, user disabilities, and so forth.

If the gesture is recognized, illustrated block 44 determines whether a gesture enabled application is running on the mobile device (e.g., in the forefront of a smart phone). The application might be, for example, a browser, operating system, media playback, word processing or other application capable of mapping particular gestures to specific functions. If a gesture enabled application is running on the mobile device, block 46 may notify the application of the gesture, wherein one or more software subroutines may be performed at block 48 based on the gesture. The software subroutines may be associated with, for example, media playback, game play, word processing and/or other functions on the mobile device.

Figure 5:
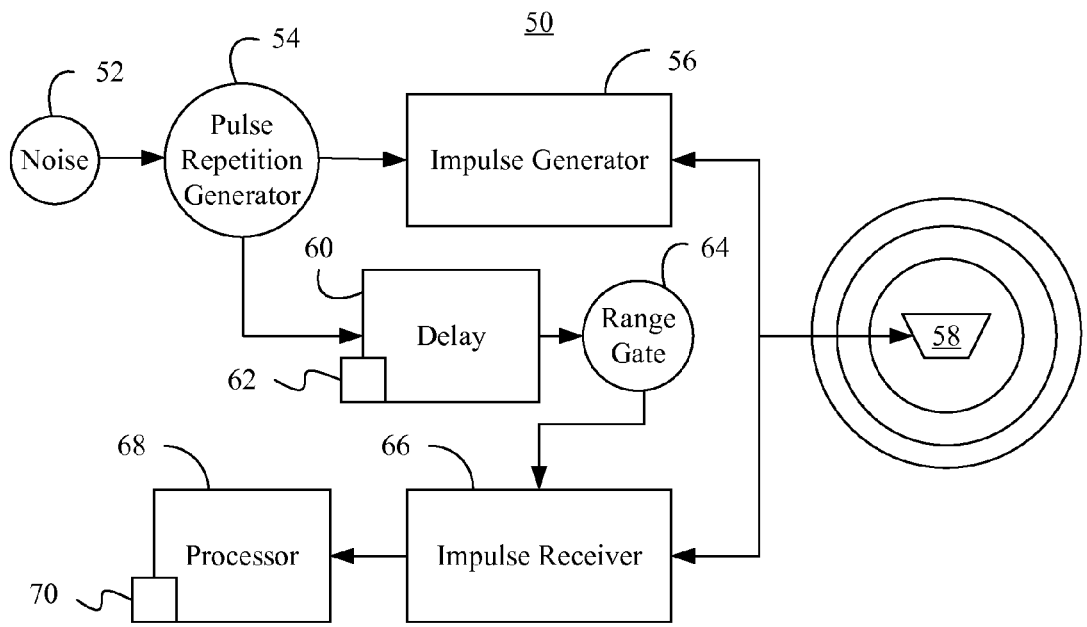
FIG. 5 is a block diagram of an example of a UWB radar module according to an embodiment.

Turning now to FIG. 5, a UWB radar module 50 is shown. The UWB radar module 50 may be readily substituted for each of the UWB radar modules 12 (FIG. 1, e.g., as an integrated circuit/IC package), already discussed. In the illustrated example, a noise source 52 may feed randomized noise into a pulse repetition generator 54, which may in turn provide the necessary timing parameters to an impulse generator 56. A plurality of outbound pulses output from the impulse generator 56 may be broadcast/transmitted via one or more antennas 58. The pulse repetition generator 54 may also notify a delay module 60 of the timing of the outbound pulses, wherein the delay module 60 may use the timing information from the pulse repetition generator 54 and configurable range input 62 to control a range gate/controller 64.

The illustrated range gate 64 controls an impulse receiver 66, which samples inbound pulses via the antenna 58. For example, the range gate 64 may selectively deactivate the impulse receiver 66 once a certain amount of time has expired since the outbound pulses were generated. The impulse receiver 66 may provide a radar processor 68 with data regarding the pulse delay/echo, wherein the illustrated radar processor 68 uses a configurable sensitivity input 70 to generate the radar measurements that enable detection and recognition of the gestures. In one example, the radar measurements are provided to another logic architecture (e.g., host processor) for gesture detection and/or recognition. The radar processor 68 may alternatively conduct the gesture detection and/or recognition internally.

Figure 6:
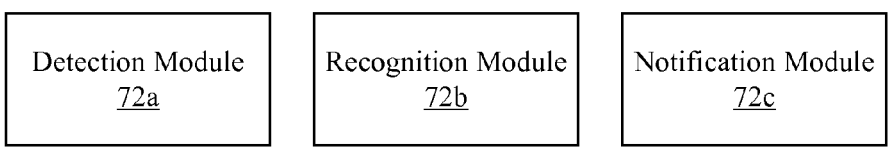
FIG. 6 is a block diagram of an example of a logic architecture according to an embodiment.

FIG. 6 shows a logic architecture 72 (72a-72c) that may be used to conduct radar-based gesture recognition. The logic architecture 72 may generally implement one or more aspects of the method 36 (FIG. 4), already discussed. In the illustrated example, a detection module 72a may use one or more radar measurements to detect a gesture of a body part relative to a mobile device, wherein a recognition module 72b may compare the gesture to one or more known gestures (e.g., based on lateral movement characteristics, depth movement characteristics, etc). The illustrated logic architecture 72 also includes a notification module 72c to notify, if the gesture corresponds to at least one of the one or more known gestures, an application running on the mobile device of the gesture.

Figure 7:
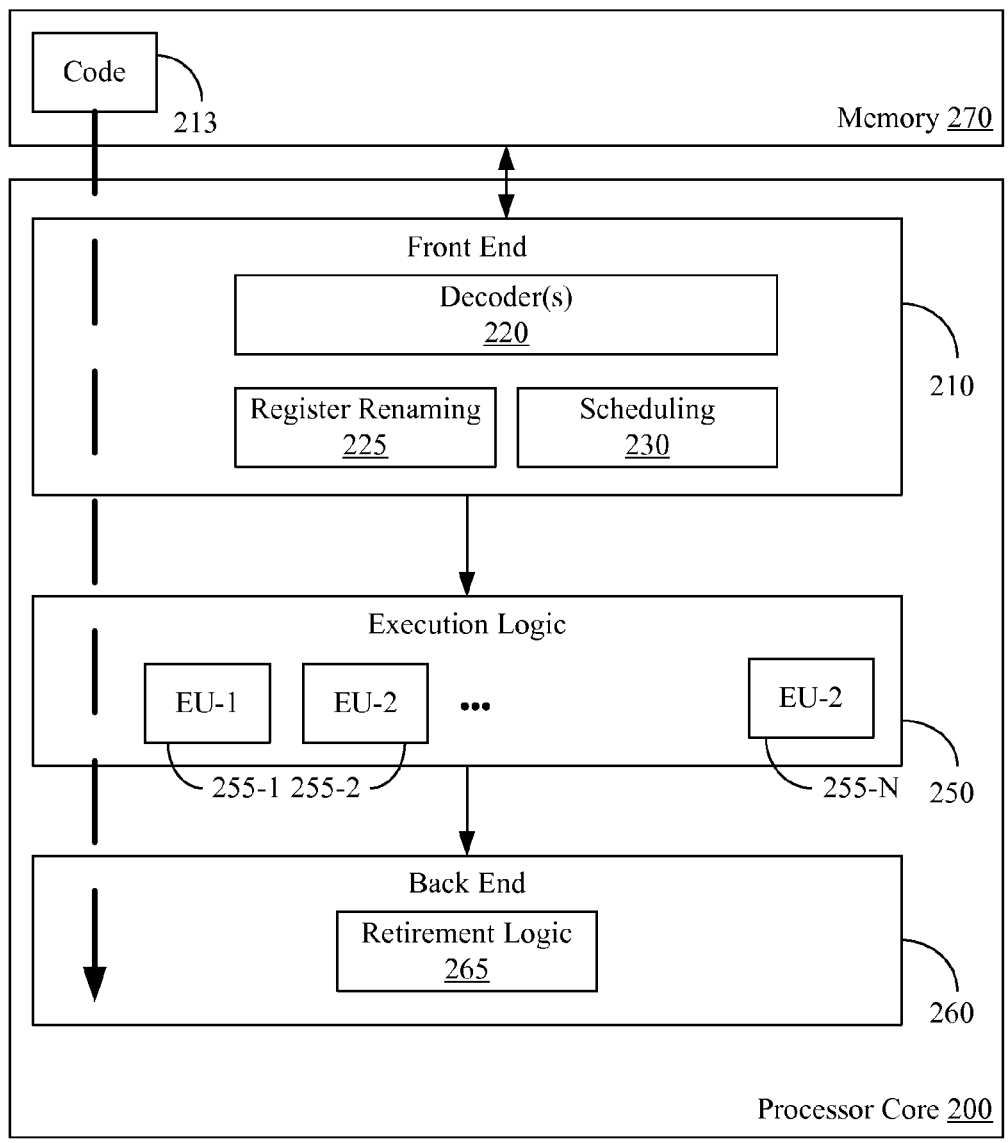
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 28 (FIG. 3) and/or the method 36 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
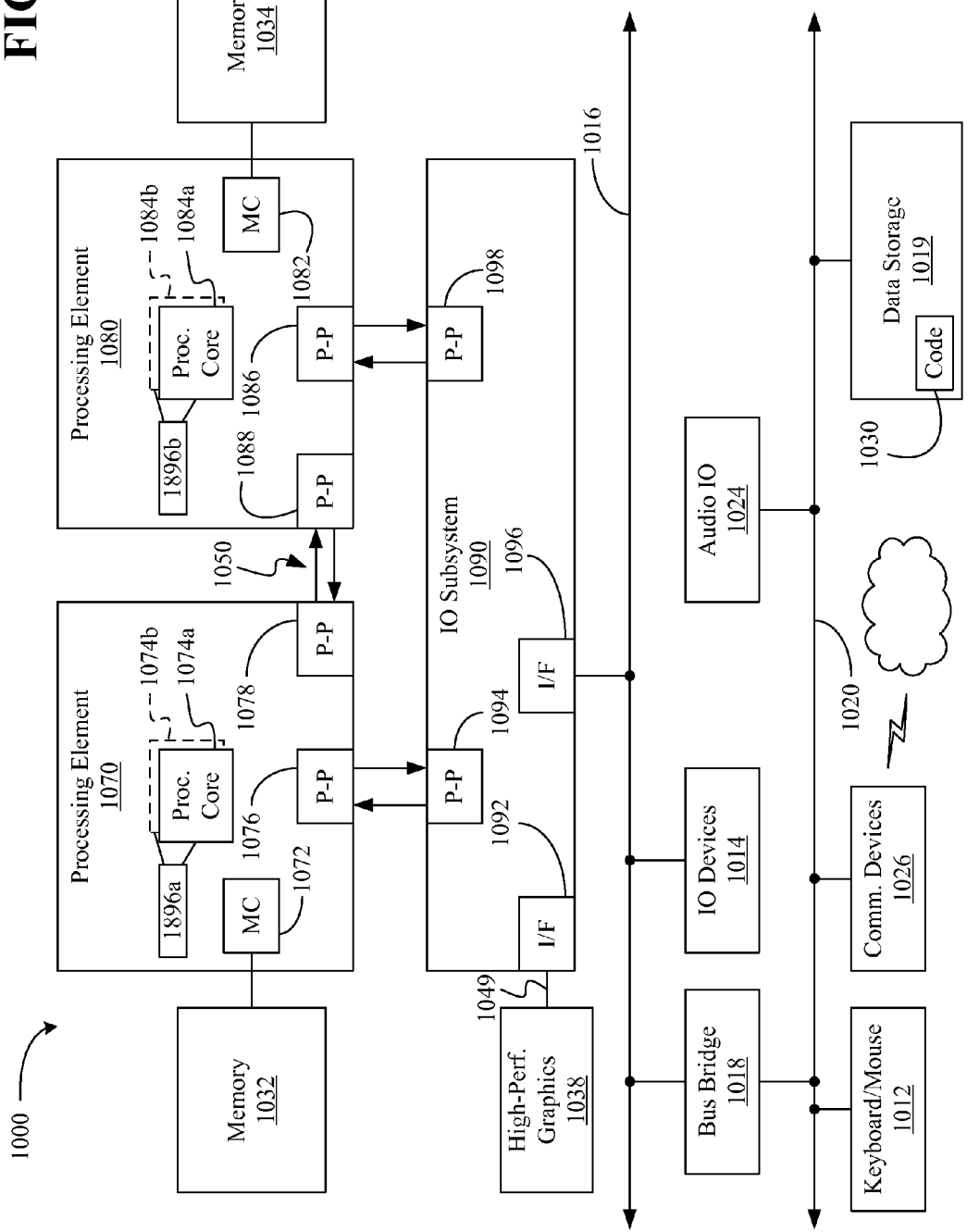
FIG. 8 is a block diagram of an example of a system according to an embodiment.

Referring now to FIG. 8, shown is a block diagram of a system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., UWB radar modules, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 28 (FIG. 3) and/or the method 36 (FIG. 4), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a mobile device to conduct gesture recognition, comprising a detection module to use one or more radar measurements to detect a gesture of a body part relative to the mobile device, a recognition module to compare the gesture to one or more known gestures, and a notification module to notify, if the gesture corresponds to at least one of the one or more known gestures, an application running on the mobile device of the gesture.

Example 2 may include the mobile device of Example 1, further including a plurality of ultra-wideband (UWB) radar modules, wherein the detection module is to obtain the one or more radar measurements from the plurality of UWB radar modules.

Example 3 may include the mobile device of Example 2, wherein each UWB radar module includes an impulse generator to generate a plurality of outbound pulses, an impulse receiver to receive a plurality of inbound pulses, and a radar processor to generate the one or more radar measurements based on the plurality of inbound pulses.

Example 4 may include the mobile device of Example 3, wherein each UWB radar module further includes a range controller to gate one or more of the plurality of inbound pulses in accordance with a range setting.

Example 5 may include the mobile device of Example 2, wherein one or more of the plurality of UWB radar modules includes an antenna positioned along an edge of the mobile device.

Example 6 may include the mobile device of Example 1, wherein the detection module is to detect the gesture while an obstruction is positioned between the body part and the mobile device.

Example 7 may include the mobile device of Example 1, further including one or more cameras having a line of sight, wherein the detection module is to detect the gesture while the body part is outside the line of sight.

Example 8 may include the mobile device of any one of Examples 1 to 7, wherein the gesture is to be a hand gesture.

Example 9 may include the mobile device of any one of Examples 1 to 7, wherein one or more of the detection module or the recognition module is to identify a lateral characteristic of the gesture.

Example 10 may include the mobile device of any one of Examples 1 to 7, wherein one or more of the detection module or the recognition module is to identify a depth characteristic of the gesture.

Example 11 may include a method of conducting gesture recognition, comprising using one or more radar measurements to detect a gesture of a body part relative to a mobile device, comparing the gesture to one or more known gestures, and notifying, if the gesture corresponds to at least one of the one or more known gestures, an application running on the mobile device of the gesture.

Example 12 may include the method of Example 11, further including obtaining the one or more radar measurements from a plurality of ultra-wideband (UWB) radar modules coupled to the mobile device.

Example 13 may include the method of Example 11, wherein the gesture is detected while an obstruction is positioned between the body part and the mobile device.

Example 14 may include the method of Example 11, wherein the gesture is detected while the body part is outside a line of sight of one or more cameras coupled to the mobile device.

Example 15 may include the method of any one of Examples 11 to 14, wherein the gesture is a hand gesture.

Example 16 may include the method of any one of Examples 11 to 14, further including identifying a lateral characteristic of the gesture.

Example 17 may include the method of any one of Examples 11 to 14, further including identifying a depth characteristic of the gesture.

Example 18 may include at least one computer readable storage medium comprising a set of instructions which, when executed by a mobile device, cause the mobile device to use one or more radar measurements to detect a gesture of a body part relative to the mobile device, compare the gesture to one or more known gestures, and notify, if the gesture corresponds to at least one of the one or more known gestures, an application running on the mobile device of the gesture.

Example 19 may include the at least one computer readable storage medium of Example 18, wherein the instructions, when executed, cause the mobile device to obtain the one or more radar measurements from a plurality of ultra-wideband (UWB) radar modules coupled to the mobile device.

Example 20 may include the at least one computer readable storage medium of Example 18, wherein the gesture is to be detected while an obstruction is positioned between the body part and the mobile device.

Example 21 may include the at least one computer readable storage medium of Example 18, wherein the gesture is to be detected while the body part is outside a line of sight of one or more cameras coupled to the mobile device.

Example 22 may include the at least one computer readable storage medium of any one of Examples 18 to 21, wherein the gesture is to be a hand gesture.

Example 23 may include the at least one computer readable storage medium of any one of Examples 18 to 21, wherein the instructions, when executed, cause the mobile device to identify a lateral characteristic of the gesture.

Example 24 may include the at least one computer readable storage medium of any one of Examples 18 to 21, wherein the instructions, when executed, cause the mobile device to identify a depth characteristic of the gesture.

Example 25 may include a mobile device to conduct gesture recognition, comprising means for using one or more radar measurements to detect a gesture of a body part relative to a mobile device, means for comparing the gesture to one or more known gestures, and means for notifying, if the gesture corresponds to at least one of the one or more known gestures, an application running on the mobile device of the gesture.

Example 26 may include the mobile device of Example 25, further including means for obtaining the one or more radar measurements from a plurality of ultra-wideband (UWB) radar modules coupled to the mobile device.

Example 27 may include the mobile device of Example 25, wherein the gesture is to be detected while an obstruction is positioned between the body part and the mobile device.

Example 28 may include the mobile device of Example 25, wherein the gesture is to be detected while the body part is outside a line of sight of one or more cameras coupled to the mobile device.

Example 29 may include the mobile device of any one of Examples 25 to 28, wherein the gesture is to be a hand gesture.

Example 30 may include the mobile device of any one of Examples 25 to 28, further including means for identifying a lateral characteristic of the gesture.

Example 31 may include the mobile device of any one of Examples 25 to 28, further including means for identifying a depth characteristic of the gesture.

Thus, techniques described herein may enable gesture recognition in the dark, in low lighting conditions, when the user is wearing gloves, when the mobile device is inside a bag, when a cover is on the mobile device, and at wide detection angles. Small movements may be detected at relatively large distances (e.g., fifteen feet away), or at relatively small distances (e.g., sub millimeters) via the use of range gating. Moreover, the use of MUIR modules may reduce power consumption and extend battery life during gesture detection.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile device comprising:
   a face defining a reference plane parallel to and overlying the face;
   one or more cameras embedded in the mobile device;
   a plurality of ultra-wideband (UWB) radar modules, each of the plurality of UWB radar modules having:
      at least one antenna;
      a pulse repetition generator that receives noise from a randomized noise source;
      an impulse generator to generate a plurality of outbound pulses via the at least one antenna based on a timing information of the pulse repetition generator;
      an impulse receiver to receive a plurality of inbound pulses;
      a range controller to gate one or more of the plurality of inbound pulses via the at least one antenna in accordance with a range setting and the timing information from the pulse repetition generator; and
      a radar processor to generate one or more radar measurements based on the plurality of inbound pulses;
   a detection module, implemented at least partly in one or more of configurable logic or fixed functionality logic hardware, to use exclusively the one or more radar measurements to detect a gesture of a body part relative to the mobile device while an obstruction is positioned between the body part and the mobile device, the detection module further capable to detect the gesture while the body part is outside a line of sight of the one or more cameras, wherein the detection module is to obtain the one or more radar measurements from the plurality of UWB radar modules, wherein the antennas of the plurality of radar modules are positioned along the mobile device so as to enable more than 180 degrees of detection with respect to the reference plane, and wherein the detection is extendable to behind the reference plane;
   a recognition module, implemented at least partly in one or more of configurable logic or fixed functionality logic hardware, to compare the gesture to one or more known gestures; and
   a notification module, implemented at least partly in one or more of configurable logic or fixed functionality logic hardware, to notify, if the gesture corresponds to at least one of the one or more known gestures, an application running on the mobile device of the gesture, wherein the behavior of an object presented on a display of the mobile device may be controlled based on the results of the recognition module.

2. The mobile device of claim 1, wherein one or more of the plurality of UWB radar modules includes an antenna positioned along an edge of the mobile device.

3. The mobile device of claim 1, wherein the gesture is to be a hand gesture.

4. The mobile device of claim 1, wherein one or more of the detection module or the recognition module is to identify a lateral characteristic of the gesture.

5. The mobile device of claim 1, wherein one or more of the detection module or the recognition module is to identify a depth characteristic of the gesture.

6. The mobile device of claim 1, wherein the plurality of UWB radar modules have a configurable detection range so that objects and motion outside of the detection range are filterable from recognition.

7. A method comprising:
using exclusively one or more radar measurements obtained from a plurality of ultra-wideband (UWB) radar modules having:
at least one antenna;
a pulse repetition generator that receives noise from a randomized noise source;
an impulse generator to generate a plurality of outbound pulses via the at least one antenna based on a timing information of the pulse repetition generator;
an impulse receiver to receive a plurality of inbound pulses; a range controller to gate one or more of the plurality of inbound pulses via the at least one antenna in accordance with a range setting and the timing information from the pulse repetition generator; and
a radar processor to generate one or more radar measurements based on the plurality of inbound pulses,
wherein the plurality of UWB radar modules are coupled to a mobile device having a face defining a reference plane parallel to and overlying the face and further having one or more cameras embedded within the mobile device, the plurality of UWB radar modules to detect a gesture of a body part relative to the mobile device with more than 180 degrees of detection with respect to the reference plane, wherein the gesture is detected while an obstruction is positioned between the body part and the mobile device and while the body part is outside a line of sight of the one or more cameras embedded within the mobile device, wherein the detection is extendable to behind the reference plane;
comparing the gesture to one or more known gestures;
notifying, if the gesture corresponds to at least one of the one or more known gestures, an application running on the mobile device of the gesture; and
controlling the behavior of an object presented on a display of the mobile device based on the gesture if the gesture corresponds to a known gesture.

8. The method of claim 7, wherein the gesture is a hand gesture.

9. The method of claim 7, further including identifying a lateral characteristic of the gesture.

10. The method of claim 7, further including identifying a depth characteristic of the gesture.

11. The method of claim 7, further including configuring a detection range of the plurality of UWB radar modules so that objects and motion outside of the detection range are filterable from recognition.

12. At least one non-transitory computer readable storage medium comprising a set of instructions which, when executed by a mobile device that is to include a face defining a reference plane parallel to and overlying the face and further having one or more cameras embedded within the mobile device, causes the mobile device to:
use exclusively one or more radar measurements obtained from a plurality of ultra-wideband (UWB) radar modules having:
at least one antenna;
a pulse repetition generator that receives noise from a randomized noise source;
an impulse generator to generate a plurality of outbound pulses via the at least one antenna based on a timing information of the pulse repetition generator;
an impulse receiver to receive a plurality of inbound pulses;
a range controller to gate one or more of the plurality of inbound pulses via the at least one antenna in accordance with a range setting and the timing information from the pulse repetition generator; and
a radar processor to generate one or more radar measurements based on the plurality of inbound pulses,
wherein the plurality of UWB radar modules are coupled to the mobile device to detect a gesture of a body part relative to the mobile device with more than 180 degrees of detection with respect to the reference plane while an obstruction is positioned between the body part and the mobile device and while the body part is outside a line of sight of the one or more cameras embedded within the mobile device, wherein the detection is extendable to behind the reference plane;
compare the gesture to one or more known gestures;
notify, if the gesture corresponds to at least one of the one or more known gestures, an application running on the mobile device of the gesture; and
control the behavior of an object presented on a display of the mobile device based on the gesture if the gesture corresponds to a known gesture.

13. The at least one non-transitory computer readable storage medium of claim 12, wherein the gesture is to be a hand gesture.

14. The at least one non-transitory computer readable storage medium of claim 12, wherein the instructions, when executed, cause the mobile device to identify a lateral characteristic of the gesture.

15. The at least one non-transitory computer readable storage medium of claim 12, wherein the instructions, when executed, cause the mobile device to identify a depth characteristic of the gesture.

16. The at least one non-transitory computer readable storage medium of claim 12, wherein the instructions, when executed, configure a detection range of the plurality of UWB radar modules so that objects and motion outside of the detection range are filterable from recognition.

* * * * *